United States Patent
Kroeger et al.

(10) Patent No.: US 7,443,853 B2
(45) Date of Patent: Oct. 28, 2008

(54) METHOD FOR TRANSMITTING ETHERNET FRAMES

(75) Inventors: Reinhold Kroeger, Vettelschoss (DE); Marcus Thoss, Wiesbaden (DE)

(73) Assignee: Siemens AG, Munich (DE)

( * ) Notice: Subject to any disclaimer, the term of this patent is extended or adjusted under 35 U.S.C. 154(b) by 1025 days.

(21) Appl. No.: 09/935,573

(22) Filed: Aug. 24, 2001

(65) Prior Publication Data

US 2002/0034180 A1  Mar. 21, 2002

Related U.S. Application Data

(63) Continuation of application No. PCT/DE00/00420, filed on Feb. 14, 2000.

(30) Foreign Application Priority Data

Feb. 26, 1999  (DE)  ................ 199 08 510

(51) Int. Cl.
 *H04J 3/22* (2006.01)
 *G06F 15/173* (2006.01)
 *H04L 12/28* (2006.01)
(52) U.S. Cl. ............ 370/392; 370/466; 709/238; 709/223
(58) Field of Classification Search ........ 370/392, 370/252, 253, 474, 445, 395.53, 389, 395.52, 370/466; 709/238, 223, 203
See application file for complete search history.

(56) References Cited

U.S. PATENT DOCUMENTS

| 5,745,685 | A |   | 4/1998  | Kirchner et al. |
| 5,917,820 | A | * | 6/1999  | Rekhter ............ 370/392 |
| 6,041,358 | A | * | 3/2000  | Huang et al. ...... 709/238 |
| 6,111,888 | A | * | 8/2000  | Green et al. ....... 370/461 |
| 6,584,122 | B1| * | 6/2003  | Matthews et al. .. 370/493 |
| 6,654,355 | B1| * | 11/2003 | Marbach et al. .... 370/285 |

FOREIGN PATENT DOCUMENTS

EP  0 771 096 A2  5/1997

OTHER PUBLICATIONS

Bruce Boyes, "Hard real-time connectivity: It's in the CAN" Computer Design, XP002147233, Jan. 1997, Internet <http://www.computer-design.com/editorial/1997/embedded/197emcan.html>.

\* cited by examiner

*Primary Examiner*—Wing F. Chan
*Assistant Examiner*—Saba Tsegaye
(74) *Attorney, Agent, or Firm*—Sughrue Mion, PLLC

(57) ABSTRACT

A network system and method thereof is provided in which messages conforming to different protocols can be transmitted via an Ethernet enabled system. Appropriate sequences of data packets conforming to a protocol other than Ethernet are provided in Ethernet frames and the appropriate information necessary for proper packet handling is extracted form the Ethernet frame header.

9 Claims, 5 Drawing Sheets

METHOD FOR TRANSMITTING ETHERNET FRAMES

This is a Continuation of International Application PCT/DE00/00420, with an international filing date of Feb. 14, 2000, which was published under PCT Article 21(2) in German, and the disclosure of which is incorporated into this application by reference for all it discloses.

FIELD OF THE INVENTION

The present invention relates generally to a method for transmitting Ethernet frames.

BACKGROUND OF THE INVENTION

Networks are collections of independent computers which can communicate with one another over a shared medium. Prior to the development of networking technology, individual machines were isolated and limited in their range of applications.

Local area networks (LANs) are those networks usually confined to a small geographic area, such as a single building or a college campus. LANs are not necessarily simple in design, however, as they may link many hundreds of systems and service many thousands of users. The development of various standards for networking protocols and media has made possible the proliferation of LANs worldwide for business and educational applications.

Network protocols are standards that allow computers to communicate. A typical protocol defines how computers should identify one another on a network, the form that the data should take in transit, and how this information should be processed once it reaches its final destination. Protocols also define procedures for handling lost or damaged transmissions or "packets." IPX, TCP/IP, DECnet, AppleTalk and LAT are examples of network protocols.

Although each network protocol is different, they all use the physical cabling in the same manner. This common method of accessing the physical network allows multiple protocols to peacefully coexist, and allows the builder of a network to use common hardware for a variety of protocols. This concept is known as "protocol independence," meaning that the physical network does not need to concern itself with the protocols being carried.

Ethernet is the most popular LAN technology in use today. Other LAN types include Token Ring, Fiber Distributed Data Interface (FDDI), and LocalTalk. Each has its own advantages and disadvantages. Ethernet strikes a good balance between speed, price and ease of installation. These strong points, combined with wide acceptance into the computer marketplace and the ability to support virtually all popular network protocols makes Ethernet a very desirable networking technology for most computer users today.

The Ethernet standard is defined by the Institute for Electrical and Electronic Engineers (IEEE). IEEE Standard 802.3 defines rules for configuring an Ethernet as well as specifying how elements in a network interact with one another. Networks, equipment and network protocols that utilize and adhere to the IEEE standard will operate in the most efficient manner.

The CAN (Controller Area Network) is an ISO (International Organization for Standardization) defined serial communications bus originally developed during the late 1980's for the automotive industry. Its basic design specification called for a high bit rate, high immunity to electrical interference and an ability to detect any errors produced. Due to these features, the CAN serial communications bus has become widely used throughout many industries, including the automotive, manufacturing and aerospace industries.

The CAN communications protocol describes the method by which information is passed between devices. It conforms to the Open Systems Interconnection (OSI) model which is defined in terms of layers. Each layer in a device appears to communicate with the same layer in another device. Actual communication is between adjacent layers in each device and the devices are connected only by the physical medium via the physical layer of the model. The CAN architecture defines the lowest two layers of the model: the data link and physical layers. The application levels are linked to the physical medium by the layers of various emerging protocols, dedicated to particular industry areas plus any number of proprietary schemes defined by individual CAN users. One example of an industry-standard CAN-based protocol is Allen-Bradley's DEVICEnet, designed for the networking of PLCs and intelligent sensors.

The physical medium used in connection with CAN consists of a twisted-pair with appropriate termination. In the basic CAN specification, it has a transmission rate of up to 250 KBaud while full CAN runs at 1 MBaud.

The physical and data link layers will normally be transparent to the system designer and are included in any component that implements the CAN protocols. There are some microcontrollers with integral CAN interfaces, for example, the 8051-compatible Siemens C505C processor and the 16-bit SAB-C167CR. The 81C91 is a standalone CAN controller which directly interfaces to many microcontrollers. The connection to the physical medium can be implemented with discrete components or with the 82C250 integrated circuit, or other similar circuits/devices. Standalone CAN controllers are also available from Siemens and a few other providers.

FIG. 1 depicts the CAN frame format. The CAN bus offers variable frame lengths with 0 to 8 octets of useful data, programmable gross transmission rates of up to 1 MBit/s at a 40 meter segment length (the transmission rate is reduced at greater segment lengths due to fixed bit times) and message-based addressing. Message-based addressing refers to a situation where a network station is not assigned a network-wide address that serves as a destination address in a transmission process (e.g., the Media Access Control (MAC) addresses on Ethernet). Instead, each message includes a content-related identifier used by each station to select messages that each respective station is intended to receive. Since, from an application perspective, the messages can be viewed as CAN objects stored in the CAN hardware, either received or to be transmitted, the identifiers used are also referred to as "CAN Object Identifiers" (COB IDs). COB IDs are typically 11 bits long for standard CAN, or 29 bits long in the case of extended CAN. Intelligent CAN controllers, which are standard today (e.g., the CAN interface of the 80C167 microcontroller or the Intel 82527 CAN controller), are capable of simultaneously configuring various transmit and receive IDs in their hardware buffers, the actual transmit or receive procedure of which is handled without involving a processor. Together, in conjunction with excellent error detection and handling procedures, the CAN bus achieves an atomic multicast of the transmitted message.

The employed COB ID of a message includes a priority: the lower the COB ID, the higher the priority of the message. The designated priority can, thus, be used for processes such as bus arbitration, i.e., to resolve access conflicts in case of simultaneous transmission requests by different nodes. In contrast to otherwise customary procedures, the conflict is resolved during transmission without any of the messages being corrupted or lost. Instead of corrupting or losing any of the messages, the message with the highest priority is automatically provided to the CAN bus by using so-called dominant (logic 0) and recessive (logic 1) levels. For the lower priority messages that are set aside in favor of the higher priority message, the respective nodes independently attempt to re-transmit their message at the next possible instant.

Since a COB ID is normally assigned according to the content-related purpose of the transmitted data (e.g., rotational speed of the front left wheel) and not to the transmitting or receiving node, two different nodes are prohibited from simultaneously transmitting a CAN packet with the same COB ID. Within the CAN protocol this is not permitted, since the two messages are superimposed and would result in a non-defined, or at least a faulty, state on the bus.

It has been known to use existing TCP/IP stacks (e.g., under PC/Windows NT) and makes the CAN bus appear as an Ethernet. Accordingly, Ethernet frames, which are typically transferred to an Ethernet driver, are transported in pieces via the CAN bus.

OBJECTS OF THE INVENTION

An object of the present invention is to make it possible to transmit Ethernet frames via a transmission protocol other than the Ethernet standard protocol.

Another object is to provide a transmission protocol must, therefore, be developed, which transmits the Ethernet frames by means of suitable sequences of CAN packets between the stations involved. Additionally, the information relevant to the transmission protocol must be extracted from the Ethernet headers of the frames to be transmitted.

SUMMARY OF THE INVENTION

In accordance with a preferred embodiment of the invention, this and other objects are solved by providing a method for transmitting Ethernet frames where a transmission protocol, other than the standard Ethernet protocol, can be determined from a header of the Ethernet frames. For example, the CAN protocol can be used. A pair of object identifiers can be assigned to a pair of nodes, thus, facilitating communication between the nodes using the Ethernet frames. Also, a server can be provided that manages a finite number of the object identifiers and recalls certain assigned object identifiers when the number of unused object identifiers drops below a certain level.

Also, in accordance with the present invention, a subscriber node can be provided that sends a registration request to the server and the server assigns a private unique object identifier to the subscriber node that requested the registration. Further, control messages can be transmitted to one or more subscriber nodes, for which each of a plurality of stations is continuously receive-ready.

BRIEF DESCRIPTION OF THE DRAWINGS

The invention as well as embodiments and advantages thereof are described below in greater detail, by way of example, with reference to the drawings in which.

DETAILED DESCRIPTION OF THE PREFERRED EMBODIMENTS

Figure 2:
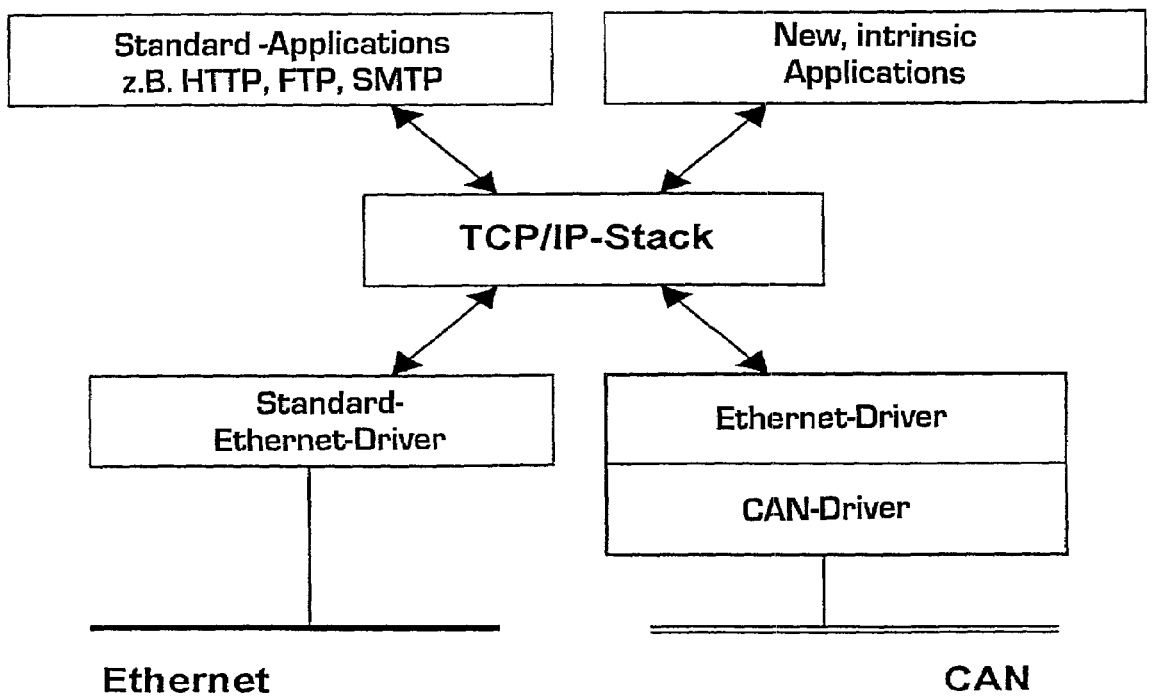
FIG. 2 shows the rough architecture of the system according to the invention.

The basic architecture in accordance with the present invention is shown in FIG. 2. As illustrated, the basic architecture comprises a CAN driver layer to handle the CAN hardware and an Ethernet driver layer to communicate in downward direction with the CAN driver and to interact in upward direction with the TCP/IP stack.

The architecture depicted in FIG. 2 provides significant advantages over conventional systems. For example, if emulation of an Ethernet segment is completely successful, transmission via CAN is fully transparent for the TCP/IP stack as well as for all other application protocols based thereon. Specifically, all the characteristics of the IP level that the stack usually provides, such as multicasting, routing, etc., are preserved. Accordingly, seamless integration of the field level in superimposed networks is provided.

This following discussion describes the basic properties of IP packets as generated by superimposed protocols, such as TCP or UDP, and Ethernet frames to which the IP packets are typically mapped in LAN environments.

Figure 3:
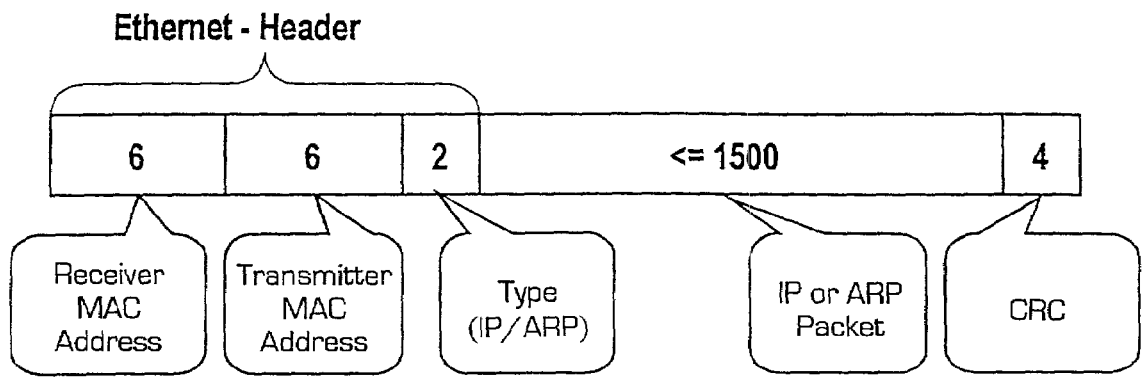
FIG. 3 illustrates an IP/ARP packet in the Ethernet frame.

The data to be transmitted by the sending application on the transport level is usually transferred via the socket interface in the form of a TCP stream or UDP packet to the TCP/IP stack where it is disassembled or packaged into network level IP packets. Each IP packet is forwarded in the form of an Ethernet frame to the underlying link layer, while taking into consideration maximum lengths. As shown in FIG. 3, the Ethernet header contains the Receiver MAC address as well as the Transmitter MAC address of the frame on the Ethernet medium. These addresses comprise the Media Access Control address (MAC address) mentioned previously and, according to IEEE Standard 803.2, the MAC address consists of a 48-bit identifier, which is unique for every Ethernet network adapter ever produced. Another Ethernet header field that must be considered is the ether_type field (Type IP/ARP) in which the type of the packet contained in the Ethernet frame is defined. Here, the types ETHERTYPE_IP for IP packets and ETHERTYPE_ARP are considered. The ETHERTYPE_ARP field is used to map IP addresses to Ethernet MAC addresses by means of the Address Resolution Protocol (ARP), which is integrated in the TCP/IP stack.

An issue that arises is how to handle the assignment between the MAC addresses of the Ethernet frames and the CAN COB IDs, which are used by the CAN hardware for transmission. The following solution in accordance with the present invention is proposed.

The fundamental difference between station-oriented addressing on the Ethernet side and message-oriented addressing within the CAN protocol has already been described.

To realize transparent IP communication between the subscriber nodes, thus, requires unique addressing of the individual stations. In addition, the Ethernet standard provides for the possibility of broadcasts and multicasts, i.e., of Ethernet frames, which are simultaneously addressed to all or to a subset of the stations that are connected to the medium.

In contrast, CAN-based network nodes are generally capable of receiving any CAN packet transmitted on the bus if one of the receive buffers in the hardware is configured for the corresponding CAN identifier of the message. No unique assignment to a buffer needs to be made since the employed hardware also contains buffers whose acceptance of an identifier can be masked via a register so that the receive buffer will accept all COB IDs containing a certain bit pattern or even any CAN identifier. Likewise, each station is capable of transmitting CAN packets with different, freely selectable COB Ids, by configuring corresponding send buffers.

One approach for mapping Ethernet addressing is to assign each subscriber a fixed COB ID. According to this method, the COB ID cannot be a station-related receive address since this would violate the prohibition of simultaneously putting two CAN messages with the same ID on the bus if the respective station is to receive messages from two different nodes at the same time. This situation would leave the assignment of the transmitter identifier as the ID uniquely assigned to a node. The station addressed as the receiver, however, could then be encoded only in the data portion of the CAN message. A station would consequently have to receive all of the transmitted messages, evaluate their content and discard the packets addressed to other stations in order to determine whether it was addressed directly. This would not only increase the system load to the maximum, but the address of the target station would in addition have to be accommodated in the useful data of each packet, which is already tight at 8 bytes.

Figure 4:
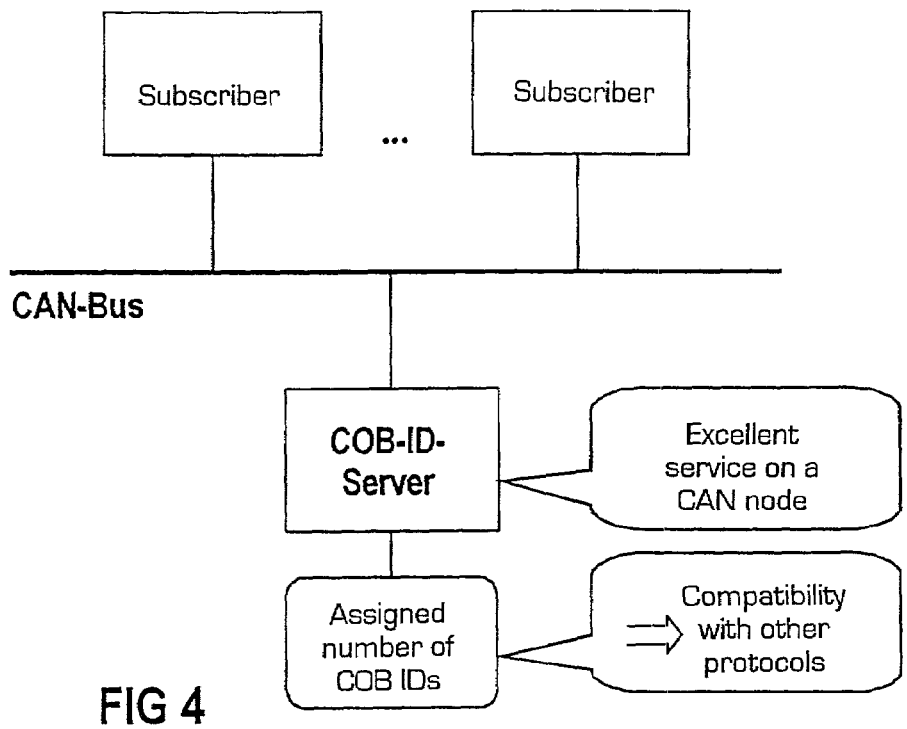
FIG. 4 illustrates the administration of the CAN object identifiers by a COB ID server.

According to the present invention, a model has been developed, as illustrated in FIG. 4, which avoids the aforementioned problems but requires a node in a CAN segment, which acts as a central instance.

The node mentioned above is the so-called COB ID server, which manages the number of usable COB IDs. The number of COB IDs that can be used for Ethernet emulation can be freely defined. This ensures the required compatibility with the other CAN protocols on the CAN bus. For the transport of the useful data, which forms Ethernet frames, each pair of nodes communicating with one another is associated with a corresponding pair of COB IDs. For broadcasting, each node ready for sending receives a COB ID from the COB ID server. The receivers involved follow the assignment of COB IDs and prepare to receive packets with these identifiers and therefore ignore packets intended for other stations.

The assignments that have been made can be readily maintained for subsequent communication processes between node pairs. Only when free COB IDs become increasingly scarce does the server have to request the assigned COB IDs to be returned. The protocol for managing the COB IDs will be described in detail below.

For correct initialization of the system, each subscriber node preferably has a unique station address within the Ethernet emulation of a CAN segment, which is already defined at the time of installation. The unique station address serves to identify the node within the initialization phase of the protocol between the node and the COB ID server.

Figure 5:
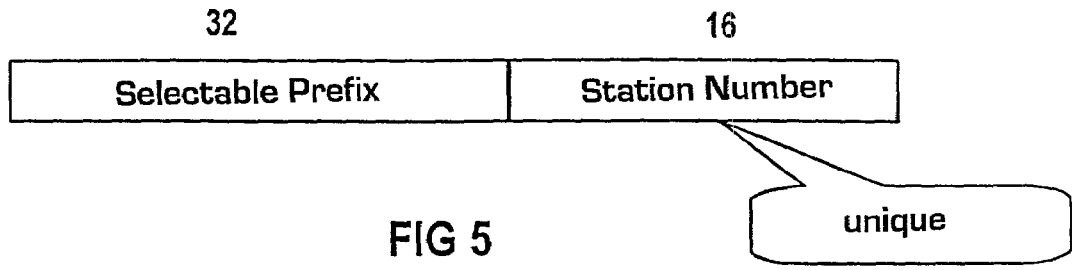
FIG. 5 shows MAC addresses of CAN nodes.

For this purpose, an unsigned 16-bit value was selected. Thus, a theoretical maximum of 64 k nodes can be addressed. At the same time, this 16-bit value forms the lower 16 bits of the Ethernet MAC address of the station in the context of the emulation. The higher order bits are set on a fixed prefix, e.g., 0 (cf. FIG. 5). Since this is only an Ethernet emulation and not the actual medium, these MAC addresses do not conflict with those of "genuine" Ethernet adapters on a segment.

Figure 1:
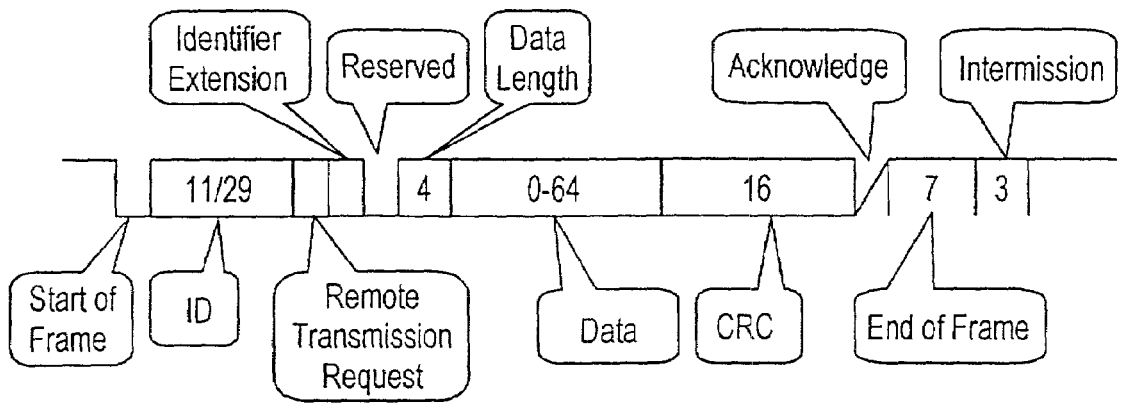
FIG. 1 illustrates the CAN frame format.

The Ethernet emulation layer integrated into the subscriber nodes and the application of the COB ID server together implement a protocol that permits the assignment of COB IDs for different purposes and regulates flow control in the communication sequence between the nodes. The Ethernet layer of the subscriber nodes acts as a protocol layer between TCP/IP implementation and the CAN driver (cf. FIG. 1).

It is the responsibility of the Ethernet layer to; map the Ethernet MAC addresses to COB Ids; segment and reassemble Ethernet frames in CAN packets; and manage the associated CAN objects in the hardware with the aid of the CAN driver.

The job of the COB ID server (hereinafter also referred to as the "server") is to store and organize the management information for handling the protocol between the subscriber nodes, particularly for the correct and efficient use of COB IDs to transmit Ethernet frames.

Figure 6:
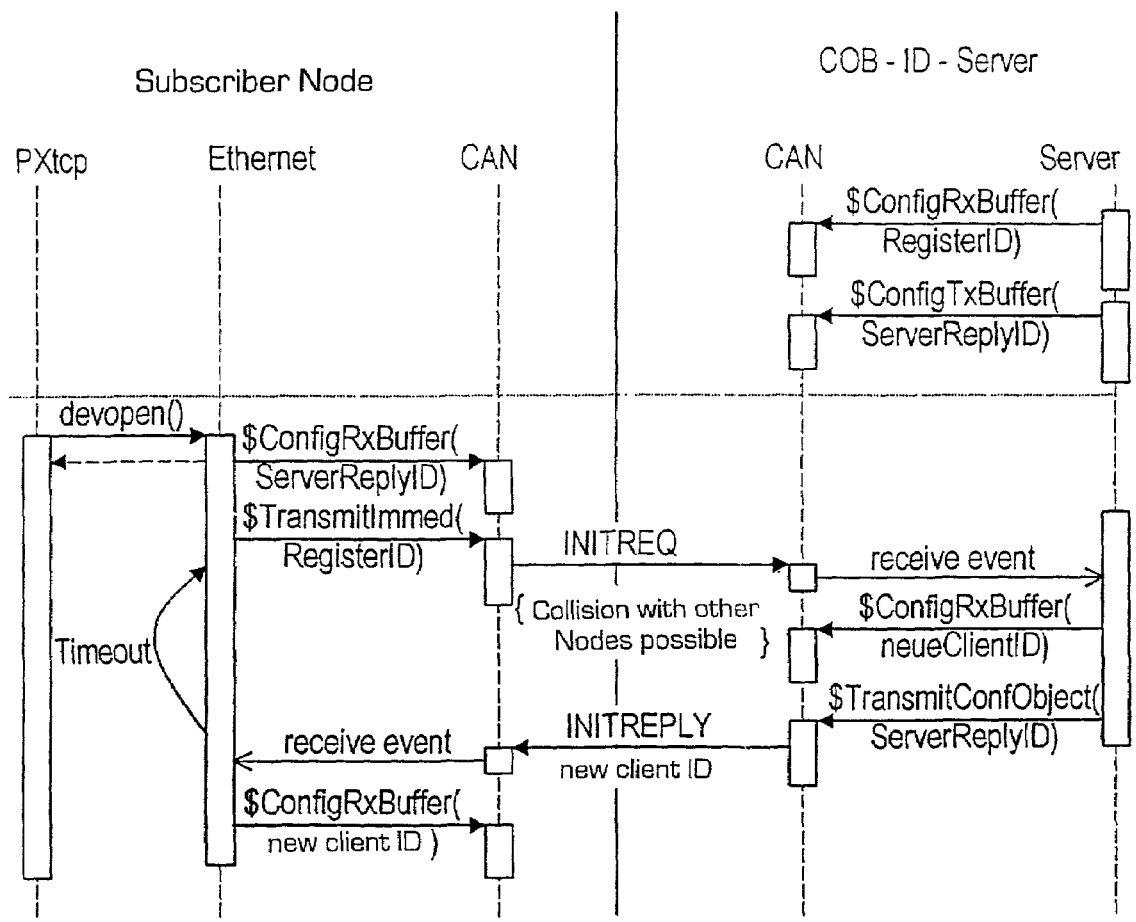
FIG. 6 illustrates the registration of a subscriber in the COB ID server.

The COB ID server protocol includes a dynamic initialization protocol, which a new subscriber uses to register with the COB ID server. One protocol sequence according to the present invention is illustrated in FIG. 6. As soon as a subscriber node has locally initialized itself, the subscriber node sends a registration request with a well known COB ID to the COB ID server. This well known COB ID can be determined at the time of configuration and can be used for registration by all subscribers. To this extent, a collision may theoretically occur, namely if several subscribers simultaneously request registration, which would lead to a detected faulty transmission on the CAN bus. This conflict is resolved by using the Carrier Sense Multiple Access/Collision Detect (CSMA/CD) mechanism. A CSMA/CD is the protocol for carrier transmission access in Ethernet networks. On Ethernet, any device can try to send a frame at any time. Each device senses whether the line is idle and therefore available to be used. If the line is ready for use, the device begins to transmit its first frame. If another device has tried to send at the same time, a collision is said to occur and the frames are discarded. Each device then waits a random amount of time and retries until successful in getting its transmission sent.

If registration is successful, the server assigns a private unique COB ID to the registering subscriber, which the subscriber station then uses for all further communication with the server. In this response message and in any further control messages, the server uses a second well known COB ID, for which all nodes participating in the protocol must be continuously ready to receive status messages or control messages. This also implies, however, that all nodes will receive every message of the server (i.e., multicasting). Each of the receivers must use the corresponding packet content to evaluate whether the message was intended for that particular receiver. Since multicasting of control messages occurs rarely, as compared to useful data transmissions, the complexity thereby generated must be regarded as low.

The two "well known" COB IDs discussed above are the only two identifiers reserved by the "IP via CAN" protocol that are defined throughout the system at the time of installation. All other COB IDs are assigned by the server and may be withdrawn after use if necessary. For the COB IDs that are available in this regard, fixed areas are currently defined in the server code. A dynamic definition of corresponding COB ID pools, e.g., at the time of initialization of the server, can take into account the needs of other applications that coexist on the CAN bus. Thus, the requirement for compatibility of the protocol with other CAN protocols is optimally met.

Transmission orders of the higher protocol layer for Ethernet frames and the resultant procedures in the COB ID server protocol will now be discussed. If, in a subscriber node, an Ethernet frame is forwarded for transmission, the destination address in the Ethernet header is first evaluated and any further processing will depend on whether it is a real station address or a broadcast address. A multicast address, which is also possible, is treated like a broadcast transmission and will not be further discussed here.

Figure 7:
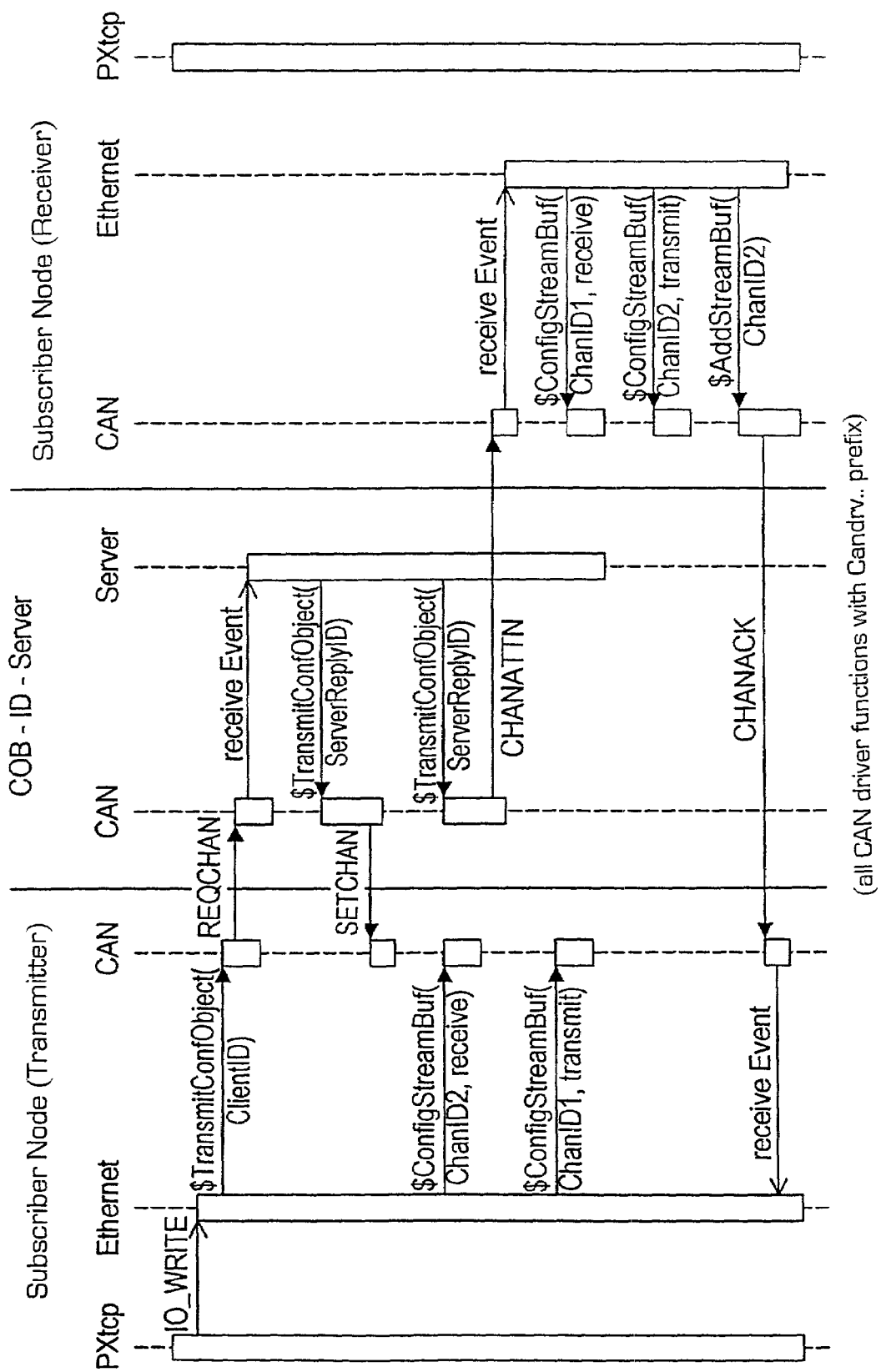
FIG. 7 shows the assignment of a point-to-point COB ID.
Figure 8:
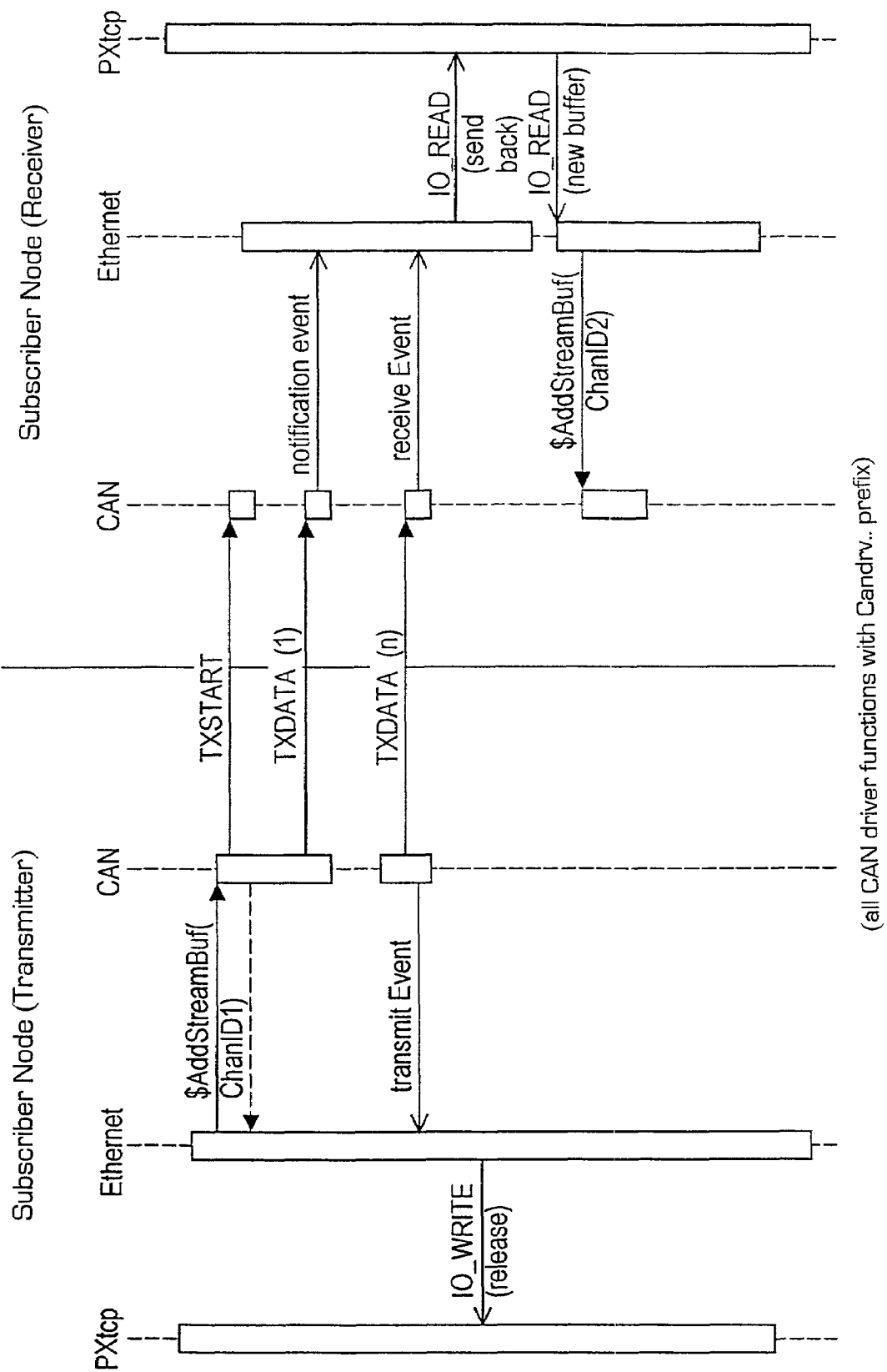
FIG. 8 depicts the transmission of an Ethernet frame.

A point-to-point transmission of an Ethernet frame to a specific station with a given MAC address starts with the request of a COB ID pair from the COB ID server as shown in FIG. 7. The COB ID to be used is assigned, as described above, via the well known COB ID. The COB ID is also registered by all the other stations on the bus, but is taken into account only by the partner station of the sender, which gets ready to receive the first identifier and then sends a CAN packet, addressed with the second assigned COB ID as an acknowledgment to the first station that is prepared to receive this identifier. The Ethernet frames can now be transmitted.

The sending node starts transmission of the Ethernet frames with a first CAN packet that contains the length of the Ethernet frame and the first useful data. All other nodes receive this packet and the immediately following CAN packets without any additional control information, and put them together to form a received Ethernet frame. When transmission of the frame is complete, the frame is forwarded to the upper network layers.

If the transmission is a broadcast message, it is handled similarly to the point-to-point transmission. That is, the transmitting subscriber node requests a broadcast COB ID from the COB ID server. The COB ID to be used is again assigned via the well known COB ID and is registered by all other stations or the bus, which in this case can configure themselves with the new COB ID to receive the broadcast frame.

The COB IDs that are assigned for a specific purpose can be reused in a renewed communication between the same station pair until the COB ID server withdraws them due to a lack of available COB IDs. In a point-to-point transmission in the opposite direction to a previous transmission, the assigned COB ID pair is used again; the participating stations alone are decisive. The same applies to renewed broadcasts.

The recall of a COB ID or pair assigned by the COB ID server is initiated when the number of COB IDs still available for assignment in the COB ID server falls below a critical value. Sequence and scope of the recall can be implemented in accordance with any strategy desired. A simple implementation that has been used employs a FIFO (First In First Out) algorithm. The COB ID server can also monitor the actual usage of assigned COB IDs by the subscriber nodes over time and use this information as the basis, for example, for an LRU (Least Recently Used) algorithm for selecting the recalls. To initiate a recall, the COB ID server sends to each station involved a return request that contains the station address of the node and the corresponding COB ID. Any packet that is still being transmitted over the corresponding channel can be completed by the node before the return of the COB ID is confirmed by the subsequently transmitting node by means of a return response to the COB ID server.

Finally, the COB ID server adds the returned COB IDs again to its supply of available COB IDs and acknowledges the return with a corresponding control message. The nodes can then deinitialize the associated send and receive objects and remove the entries from the local assignment tables. Acknowledgment by the COB ID server is provided to prevent a node from losing its receiving readiness for a COB ID before the distant terminal has adjusted all transmission procedures to this ID. The process described above for a COB ID pair applies correspondingly to COB IDs assigned for broadcast purposes, in which case only one node and the COB ID server are involved.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for transmitting Ethernet frames through sequences of data packets of a transmission protocol, with the information relevant for the transmission protocol being extracted from a header of the Ethernet frame, the method comprising:

administering by a central entity (CAN Object Identifier Server) a freely definable number of usable CAN (Controller Area Network) object identifiers; and upon request by a communication node ready for sending Ethernet frames to a receiving communication node, assigning by the central entity (CAN Object Identifier Server) to the communication node and the receiving communication node a pair out of said CAN (Controller Are Network) object identifiers.

2. The method according to claim 1, wherein the central entity (CAN Object Identifier Server) requests return of the assigned CAN object identifiers as supply of free CAN object identifiers becomes scarce.

3. The method according to claim 2, wherein a subscriber node sends a registration request ot the central entity (CAN Object Identifier Server) and the central entity (CAN Object Identifier Server) allocates a private unique CAN object identifier to the subscriber node.

4. The method according to claim 2, wherein the central entity (CAN Object Identifier Server) uses a code for which each of a plurality of stations is continuously receive-ready, transferring control messages to at least one subscriber node.

5. The method according to claim 1, wherein a subscriber node sends a registration request to the central entity (CAN Object Identifier Server) and the central entity (CAN Object Identifier Server) allocates a private unique CAN object identifier to the subscriber node.

6. The method according to claim 1, wherein the central entity (CAN Object Identifier Server) uses a code for which each of a plurality of station is continuously receive-ready, transferring control messages to at least one subscriber node.

7. The method according to claim 1, wherein each of the pair of CAN object identifiers is assigned to a respective node from the communication node and the receiving communication node and wherein each of the pair of CAN object identifiers identifies the respective node from the pair of nodes.

8. The method according to claim 1, wherein the number of the usable CAN object identifiers is not bound by a number of nodes.

9. The method according to claim 1, wherein the number of the usable CAN object identifiers is independent from a number of nodes.

* * * * *